(12) United States Patent
Nishida (10) Patent No.: US 7,634,600 B2
(45) Date of Patent: Dec. 15, 2009

(54) EMULATION SYSTEM AND EMULATION METHOD FOR MULTIPLE RECORDING MEDIA TUPES

(75) Inventor: Tsuyoshi Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 10/988,539

(22) Filed: Nov. 16, 2004

(65) Prior Publication Data

US 2005/0138247 A1 Jun. 23, 2005

(30) Foreign Application Priority Data

Dec. 22, 2003 (JP) ............................ 2003-424964

(51) Int. Cl.
*G06F 13/12* (2006.01)
*G06F 13/38* (2006.01)

(52) U.S. Cl. ...................................... 710/72
(58) Field of Classification Search .................... 710/72
See application file for complete search history.

(56) References Cited

U.S. PATENT DOCUMENTS

| | | | |
|---|---|---|---|
| 5,715,418 A | | 2/1998 | Atsatt et al. |
| 5,960,460 A | | 9/1999 | Marasco et al. |
| 6,262,918 B1 | * | 7/2001 | Estakhri et al. ........ 365/185.33 |
| 6,292,443 B1 | * | 9/2001 | Awazu et al. ............ 369/44.26 |
| 6,999,913 B2 | * | 2/2006 | Hensley ........................ 703/25 |
| 7,181,560 B1 | * | 2/2007 | Grand et al. ................. 710/300 |
| 2001/0018721 A1 | * | 8/2001 | McKenna et al. ........... 710/126 |
| 2003/0037020 A1 | * | 2/2003 | Novak et al. .................... 707/1 |
| 2003/0097382 A1 | * | 5/2003 | McDonald et al. .......... 707/204 |
| 2003/0177300 A1 | * | 9/2003 | Lee et al. ..................... 711/103 |
| 2003/0195737 A1 | * | 10/2003 | Shapiro et al. ................ 703/24 |
| 2004/0005910 A1 | * | 1/2004 | Tom ............................ 455/558 |
| 2004/0111583 A1 | * | 6/2004 | Han et al. .................... 711/203 |
| 2004/0116155 A1 | * | 6/2004 | Aisenberg ................... 455/558 |
| 2004/0249797 A1 | * | 12/2004 | Jarvinen et al. ................ 707/3 |

(Continued)

FOREIGN PATENT DOCUMENTS

EP 0 712 067 A2 5/1996

(Continued)

OTHER PUBLICATIONS

European Search Report dated Sep. 8, 2005 for Appln. No. 04026567.0-2211.

(Continued)

*Primary Examiner*—Niketa I Patel
*Assistant Examiner*—Brooke J Dews
(74) *Attorney, Agent, or Firm*—Pillsbury Winthrop Shaw Pittman, LLP (57) ABSTRACT

An LBA correspondence table creating unit creates an LBA correspondence table to convert address information on a floppy disk which is a copy source into address information on an SD memory card, in relation to an FD image area. If an access to the floppy disk to be emulated is requested, an FD access control unit alternately executes access to the SD memory card on the basis of the LBA correspondence table. An FD exchange emulating unit monitors updating and deletion in an FD image SD area by an HD access control unit. If the access is made, the FD exchange emulating unit executes emulation as if the floppy disk was exchanged.

6 Claims, 6 Drawing Sheets

U.S. PATENT DOCUMENTS

2005/0080956 A1* 4/2005 Zaudtke et al. ............ 710/72

FOREIGN PATENT DOCUMENTS

| | | |
|---|---|---|
| JP | 5-289854 | 11/1993 |
| JP | 08-137634 | 5/1996 |
| JP | 2001-290606 | 10/2001 |
| WO | WO 00/49488 | 8/2000 |

OTHER PUBLICATIONS

Anonymous, "Various Kinds of Hardware", Red Hat Linux 6 Unleashed (Chapter 15) Filesystems, Disks, and Other Devices, 1999, pp. 1-5, XP002340074.

Tanenbaum et al. "Operating Systems, Design and Implementation", Englewood Cliffs, Prentice Hall, 1987, pp. 135-143, 479-481, XP 002340079.

Douglas Gilbert, "Notes on Linux's SG Driver Version 2.1.39", Mar. 29, 2001, pp. 1-28, XP002340075.

Anonymous, "Table of Contents" Red Hat Linux 6 Unleashed, pp. 1-8, XP002340076.

Anonymous, Index of /SG/P, XP 002340086.

Japanese Office Action dated Sep. 29, 2009 for Appin. No. 2003-424964.

"Original Bootable CD wo Tukaikonase"; ASCII DOS/V Issue, Japan, Kabushiki Kaisha ASCII, Oct. 1, 1998, vol. 4, No. 10, pp. 158-160.

* cited by examiner

EMULATION SYSTEM AND EMULATION METHOD FOR MULTIPLE RECORDING MEDIA TUPES

CROSS-REFERENCE TO RELATED APPLICATIONS

This application is based upon and claims the benefit of priority from prior Japanese Patent Application No. 2003-424964, filed Dec. 22, 2003, the entire contents of which are incorporated herein by reference.

BACKGROUND OF THE INVENTION

1. Field of the Invention

The present invention relates to an emulation technique capable of imaginarily constructing an environment which allows access to, for example, an SD (Secure Digital) memory card(R) to be executed in steps of access to a floppy disk(R).

2. Description of the Related Art

In recent years, a semiconductor memory mounted on, for example, a PDA (Personal Digital Assistant), a digital camera and the like has been made smaller in size and larger in capacity in accordance with the progress of the semiconductor manufacturing technology. For example, an SD memory card(R) has a storage capacity of tens to hundreds of megabytes in a size with sides 2 to 3 centimeters long. For this reason, personal computers having slots for loading of semiconductor memories as represented by the SD memory cards (R) instead of floppy disks(R) as standard equipment, have also been increased.

On the other hand, a request to continuously use the operation environment constructed on the floppy disk(R) has been strong. Thus, so-called emulating functions to handle a part or an entire body of a storage area of a storage medium as a different kind of storage medium have been variously proposed (for example, Jpn. Pat. Appln. KOKAI Publication No. 5-289854 and Jpn. Pat. Appln. KOKAI Publication No. 2001-290606).

With this kind of emulating function, the area for floppy disk(R) is reserved in, for example, the SD memory card(R) and the contents of the desired floppy disk(R) are copied in the area. Therefore, even if the personal computer is not equipped with a slot for floppy disk(R), the operation environment constructed on the floppy disk(R) can be continuously used with the only slot for SD memory card(R).

Incidentally, according to any conventional emulating function as disclosed in Jpn. Pat. Appln. KOKAI Publication No. 5-289854 or Jpn. Pat. Appln. KOKAI Publication No. 2001-290606, the area for the emulated storage medium is fixed in an area to which an upper-level system such as an operating system or the like cannot access. This certainly prevents the contents of the emulated storage medium from being rewritten due to carelessness. However, it is difficult for the personal computer user to intentionally rewrite the contents. Therefore, if the floppy disk(R) is emulated in a part of the storage area of, for example, the SD memory card(R), exchanging the floppy disk(R) is very difficult.

In addition, since the SD memory card(R) is subjected to specific processing that may exceed the file system standard, such as reserving the area for floppy disk(R) by operating the partition table of, for example, the SD memory card(R), the SD memory card(R) may not be subjected to general use in a device such as a digital camera, a mobile telephone or the like.

BRIEF SUMMARY OF THE INVENTION

According to an embodiment of the present invention, an emulation system of an electronic apparatus having a slot in which a first storage medium is loaded and which executes file management by an operating system, the emulation system comprises a discrimination unit configured to analyze a file system of the first storage medium loaded in the slot, and to discriminate whether or not an image file formed by duplicating contents of a second storage medium different in kind from the first storage medium is stored in the first storage medium; a correspondence table creation unit configured to create a address correspondence table to associate address information on the first storage medium with address information on the second storage medium in the image file, if the image file is stored in the first storage medium; and an emulation unit configured to convert the address information on the second storage medium received from the operating system into the address information on the first storage medium, in accordance with the address correspondence table, and to execute an access to the second storage medium with an access to the image file.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a flowchart showing operation steps concerning the emulation control in the electronic apparatus of the embodiment when the power of the electronic apparatus is turned on;

DETAILED DESCRIPTION OF THE INVENTION

An embodiment of the present invention will be explained below with reference to the accompanying drawings.

Figure 1:
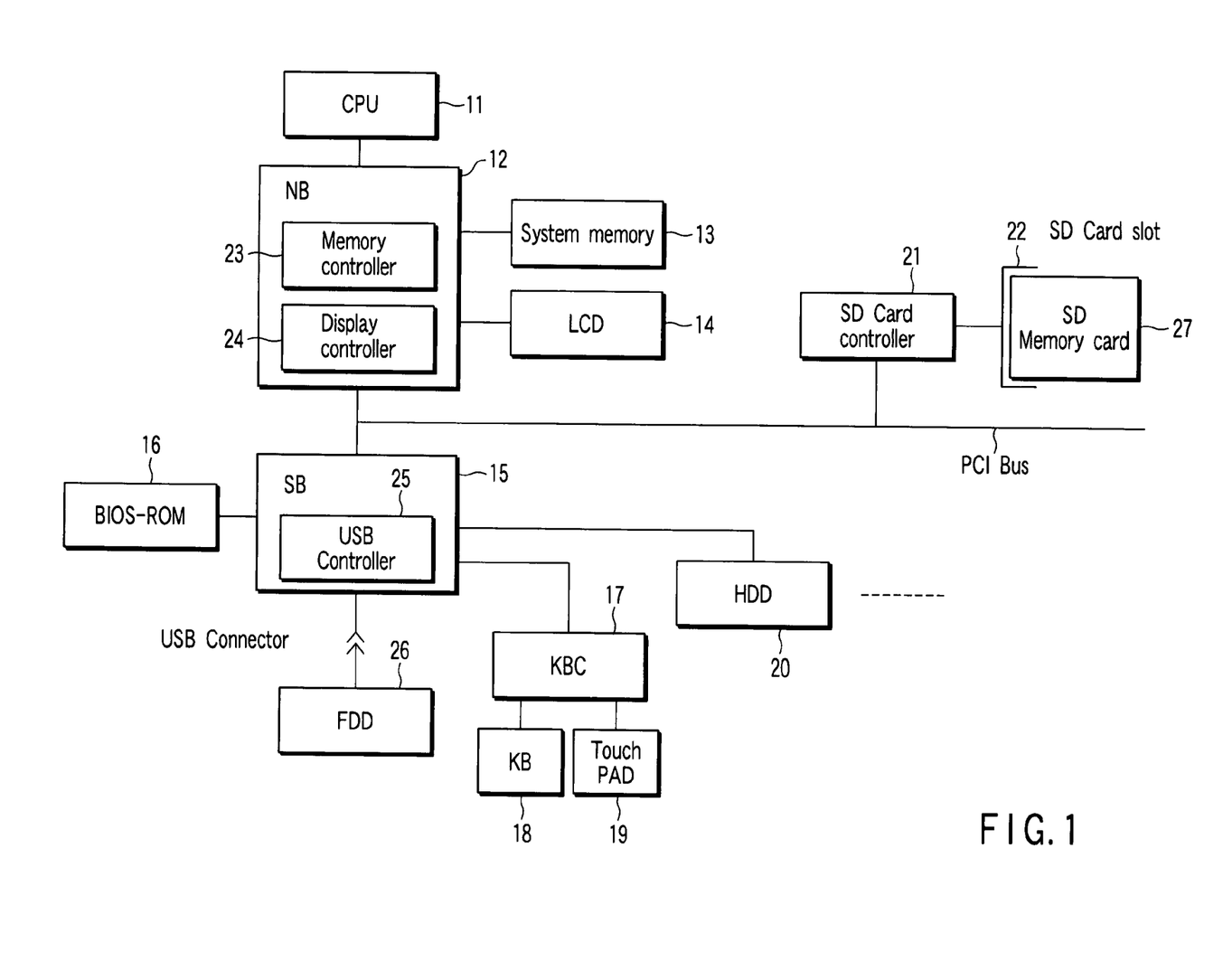
FIG. 1 is a schematic diagram of an electronic apparatus according to an embodiment of the present invention.

FIG. 1 is a schematic diagram showing an electronic apparatus according to an embodiment of the present invention.

The electronic apparatus is, for example, a portable personal computer. As shown in the figure, the personal computer comprises a CPU 11, a north bridge (NB) 12, a system memory 13, an LCD (Liquid Crystal Display) 14, a south bridge (SB) 15, a BIOS (Basic Input/Output System) ROM 16, a keyboard controller (KBC) 17, a keyboard (KB) 18, a touch PAD 19, a hard disk drive (HDD) 20, an SD (Secure Digital) card controller 21, an SD card slot 22, and the like.

The CPU 11 is a central unit of the electronic apparatus, controlling all of the units by executing various programs such as the operating system stored in the system memory 13 and the system BIOS stored in the BIOS-ROM 16. The NB 12 is a bridge which interconnects a CPU local bus output from the CPU 11 and a PCI bus. The NB 12 also has a function of a so-called memory controller 23 or display controller 24, controlling access to data of the system memory 13 and controlling image data formed by the CPU 11 to be displayed on the LSD 14.

The SB 15 serves as a unit having the same bridging function and connects the BIOS-ROM 16, the KBC 17, the HDD 20, and the like to the PCI bus. The SB 15 also has a function of a so-called USB controller 25 and can be connected to, for example, a floppy disk(R) drive (FDD) 26 and the like via the USB connector.

The BIOS-ROM 16 is a storage medium which stores the system BIOS to drive the hardware, i.e. the peripheral such as the HDD 20 with the software, i.e. the operating system or the like. The BIOS-ROM 16 is configured of E2PROM or the like, such that it can be rewritten as it is upgraded. The system BIOS stored in the BIOS-ROM 16 is often called BIOS 16 in the following descriptions.

The SD card controller 21 controls access to the data in the SD memory card 27 loaded in the SD card slot 22. In other words, the SD memory card 27 and the FDD 26 can be further connected to the electronic apparatus as external memories, besides the built-in system memory 13 serving as the main memory and the built-in HDD 20 serving as the external memory.

The KBC 17 is a unit which transmits operations of the KB 18 and the touch PAD 19 to the CPU 11 via a built-in register. The HDD 20 is a large-capacity storage medium which stores various programs and various data as an auxiliary unit of the system memory 13.

Figure 2:
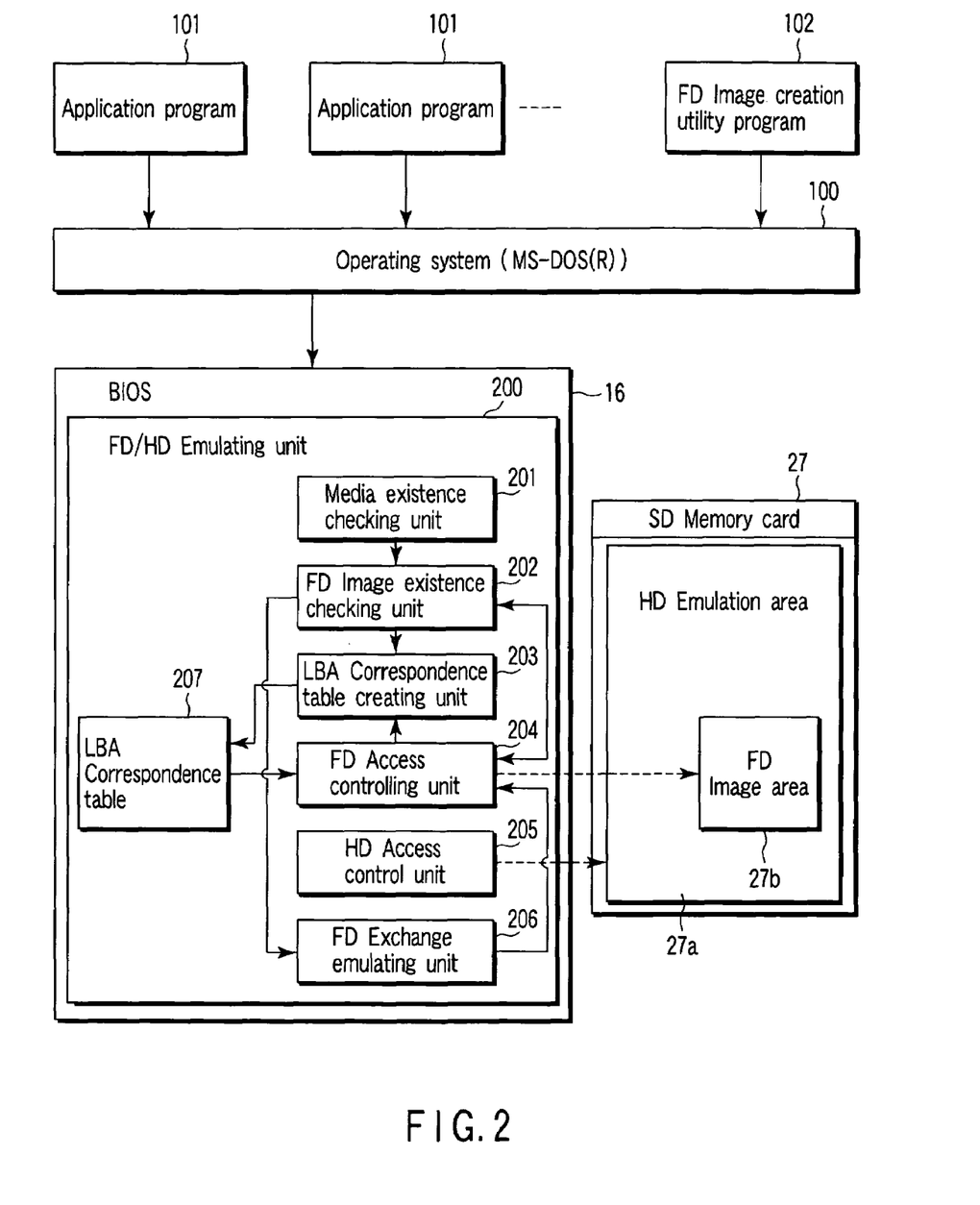
FIG. 2 is an illustration showing function blocks concerning emulation control in the electronic apparatus of the embodiment.

FIG. 2 shows function blocks concerning the emulation control in the electronic apparatus.

An application program 101 operated in the electronic apparatus executes access to the data in the HDD 20 or the like via an operating system 100. When the operating system 100 is requested the data access from the application program 101, the operating system 100 requests the actual processing to the BOIS 16, receives a result of the actual processing and sends back a result of the request to the application program 101. As the operating system 100, for example, MS-DOS(R) of Microsoft Corporation is adopted here.

MS-DOS(R) is limited in function, but has sufficient functions to use the document preparation software, spreadsheet software, and the like, and is suitable for, for example, an inexpensive portable computer having a system configuration in a small size. In addition, the system requirements of MS-DOS(R) can be set on the floppy disk(R). In not a few cases, the system requirements applied for years are set on the floppy disk(R). Thus, the electronic apparatus of this embodiment first implements the emulation that, without the FDD 26 which needs to be provided externally via the USB connector, an image in the floppy disk(R) is copied on the easily usable SD memory card(R) and the image on the SD memory card (R) can be handled as if it was on the floppy disk(R).

In addition, use of the SD memory card(R) is not supported by MS-DOS(R). Thus, secondly, the electronic apparatus of this embodiment simultaneously implements the emulation that the SD memory card(R) can be used as if the entire body of the card was a magnetic disk (usable on MS-DOS(R)).

An FD image creation utility program 102 is a tool program provided to copy the image of the floppy disk(R) on the SD memory card(R) by a simple operation. If the user wishes to copy an image of a floppy disk(R) on an SD memory card(R), the user loads the floppy disk(R) into the external FDD 26 connected via the USB connector, loads the SD memory card(R) into the SD card slot 22, and executes a sequence of operations on the basis of the display of the FD image creation utility program 102. At this time, the FD image creation utility program 102 writes the image file obtained by copying the contents of the floppy disk(R) on the SD memory card(R) (regarded as the magnetic disk), with a file name conforming to a predetermined naming convention. In other words, the image file is stored in the general data storage area on the SD memory card(R), in the same manner as that of a general file.

The image file does not need to be created by the FD image creation utility program 102, but may be created with, for example, a command prepared by the operating system 100, by a user having knowledge to create an image file with a file name conforming to the predetermined naming rule. In addition, the image file may be created with, for example, the desktop PC or other electronic apparatus. In this case, the FDD 26 or the FD image creation utility program 102 is unnecessary for the electronic apparatus.

Two emulations explained above are implemented by an FD/HD emulating unit 200 (emulation system) of the BOIS 16. To implement them, the FD/HD emulating unit 200 comprises various processing units such as a media existence checking unit 201, an FD image existence checking unit 202, an LBA correspondence table creating unit 203, an FD access controlling unit 204, an HD access control unit 205 and an FD exchange emulating unit 206, and an LBA correspondence table 207 serving as a data unit.

When the power of the electronic apparatus is turned on, the media existence checking unit 201 checks whether or not the SD memory card(R) 27 is loaded in the SD card slot 22. Similarly to the magnetic disk, the SD memory card(R) 27 is a nonvolatile storage medium having so-called partition information. According to the standards of the SD memory card(R) 27, FAT (File Allocation Table) 12 or FAT 16 in which the BIOS 16 can process the data is adopted as the file system. Therefore, if the SD memory card(R) 27 is loaded, the SD memory card(R) 27 can be handled similarly to the magnetic disk, by only transferring the contents of the filing system to the operating system as those of the magnetic disk by the media existence checking unit 201. The data memory area on the SD memory card(R) 27 handled similarly to the magnetic disk is called HD emulation area 27a.

At this time, the media existence checking unit 201 checks whether or not the file system of the SD card slot 22 is formally supported. If the file system is not, the media existence checking unit 201 determines that the SD memory card (R) 27 is not loaded in the SD card slot 22.

If the SD memory card(R) 27 is loaded in the SD card slot 22, the FD image existence checking unit 202 analyzes the file system of the SD memory card(R) 27 and checks whether or not the image file written by the FD image creation utility program 102 (with a file name conforming to the predetermined naming rule) exists on the SD memory card(R) 27.

Figure 3:
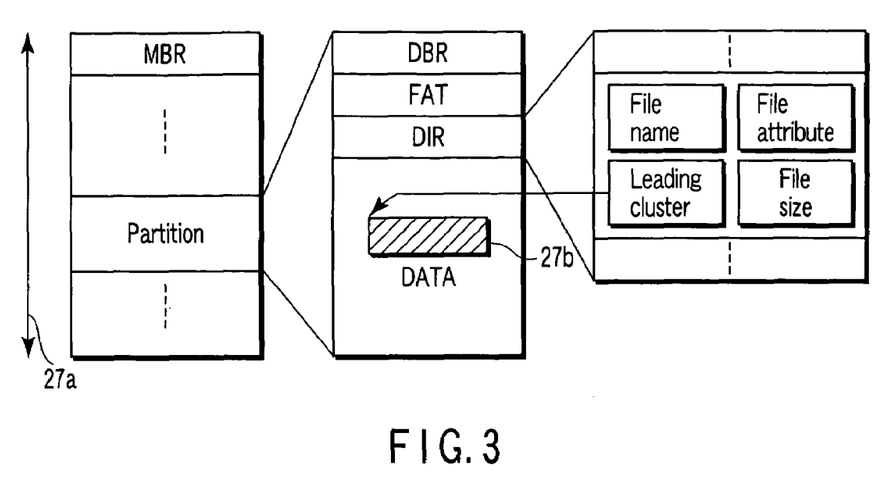
FIG. 3 is an illustration showing logical structure of an SD memory card(R)

FIG. 3 shows the logical structure of the SD memory card (R) 27. The FD image existence checking unit 202 first obtains LBA (Logical Block Address) of DBR (DOS Boot Record) from the partition table inside the MBR (Master Boot Record). In the FAT file system, the information is largely divided into four areas of DBR, FAT, DIR (Directory entry) and DATA. The FAT includes link information representing which cluster each file is stored in. In the DIR, information items such as the name, size, attributes, leading cluster number and the like of each file, are stored. Thus, by sequentially referring to the DIR corresponding to each DBR whose LBA is obtained, the FD image existence checking unit 202 retrieves the image file (having the file name conforming to the predetermined naming rule) and determines existence of the image file. If the FD image existence checking unit 202 detects the image file, the FD image existence checking unit 202 also detects the kind of floppy disk(R) (1.44 M bytes: 512 bytes/sector, 720 K bytes: 512 bytes/sector, or the like) from which the image file has come, from the file size information of the DIR.

If the image file exists on the SD memory card(R) 27, the FD image existence checking unit 202 notifies the LBA correspondence table creating unit 203 of the existence, and transfers the contents of the file system of the floppy disk(R) copied in the image file to the operating system 100 as those of the floppy disk(R). The floppy disk(R) can be thereby handled as if it existed. The data storage area on the SD memory card(R) 27 in which the image file is stored is called FD image area 27b. The image file is also recognized as a file in the HD emulation area 27a by the operating system 100 as described above.

On the other hand, the LBA correspondence table creating unit 203 notified of the existence of the image file by the FD image existence checking unit 202, creates the LBA correspondence table 207 to convert the address information in the FD image area 27b specified by the file system of the floppy disk(R) into the address information in the FD image area 27b specified by the file system of the SD memory card(R) 27, while referring to both the file system of the floppy disk(R) copied in the image file detected by the FD image existence checking unit 202, and the file system of the SD memory card(R) 27. Since the access to the SD memory card(R) is substituted for the access to the floppy disk(R), the address information (FD-CHS) on the floppy disk(R) as represented in CHS (Cylinder, Head, Sector) format is converted into the address information (FD-LBA) represented in LBA format, and then the address information is converted into the address information (SD-LBA) on the floppy disk(R).

The conversion of the FD-CHS into the FD-LBA is regular and can be executed comparatively easily by calculation. The conversion of the FD-LBA into the SD-LBA is executed with the table (LBA correspondence table 207), by considering a case where image files of the floppy disk(R) may be arranged discontinuously on the SD memory card(R) 27. In other words, arranging image files of the floppy disk(R) in a fragmentized state is permitted by the conversion using the table.

Figure 4:
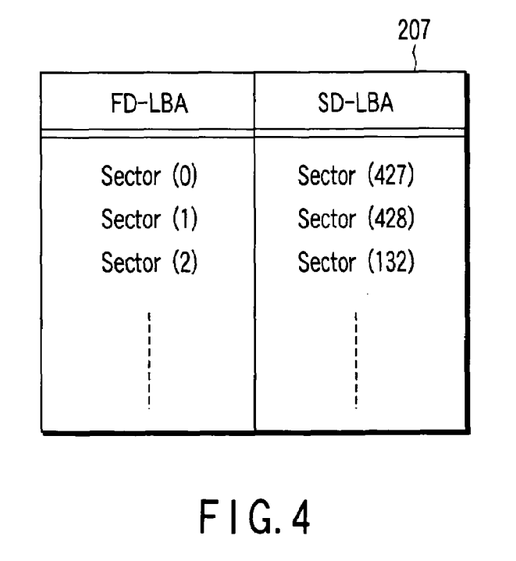
FIG. 4 is an illustration showing an example of LBA correspondence table used for the emulation control in the electronic apparatus of the embodiment.

FIG. 4 shows an example of the LBA correspondence table 207. On the LBA correspondence table 207, the address information (FD-LBA: left column of the table) of the floppy disk(R) corresponds to the address information (SD-LBA: right column of the table) in the FD image area 27b of the SD memory card(R) 27 as shown in this figure. By the correspondence of the LBA correspondence table 207, as described above, the FD image area 27b may be stored in the fragmentized state even if it is not retained in the sequential data storage area of the SD memory card(R) 27.

After that, if the operating system 100 actually requests access to the floppy disk(R), the FD access controlling unit 204 converts the address information designated as the access destination into the address information on the SD memory card(R) 27 by referring to the LBA correspondence table 207 after executing a predetermined calculation. Then, the FD access controlling unit 204 executes the access to the SD memory card(R) 27 and supplies a result of the access to the operating system 100. Thus, the address information can be processed as if the floppy disk(R) existed. For example, if the floppy disk(R) is selected as the boot device by the environment setting function of the BIOS 16, the system requirements constructed on the floppy disk(R) which is the origin of the image file can also be reproduced.

Next, a case where the operating system 100 requests access to the magnetic disk will be considered. As explained above, the image file in the FD image area 27b is merely a file in the HD emulation area 27a. Therefore, the image file can easily be rewritten or deleted by the access to the magnetic disk. Thus, updating and deleting the image file by the HD access control unit 205 are monitored by the FD exchange emulating unit 206.

When the FD image existence checking unit 202 detects the image file, the FD exchange emulating unit 206 is notified of the detection and acquires LBA of DIR in which the name of the image file is stored. Since updating and deleting the file are, generally, implemented by rewriting the management area of the file system, the BIOS 16 is notified of each of them as the writing in the LBA. Therefore, the FD exchange emulating unit 206 first checks whether or not the request for writing is directed to the LBA of the DIR in which the name of the image file is stored. If the request for writing is not directed to the LBA of the DIR, it is understood at this moment that the writing is not updating or deleting the image file.

On the other hand, if the writing is updating or deleting the image file, the FD exchange emulating unit 206 checks whether or not the writing is updating the entry in which the image file is stored. In the FAT system, for example, information items equivalent to eight files are stored in each sector. Thus, even if the request for writing is directed to the LBA of the DIR in which the name of the image file is stored, it may be directed to the other file. The FD exchange emulating unit 206 checks whether or not the writing indicates updating the entry in which the image file is stored. If it does not indicate updating the entry in which the image file is stored, the FD exchange emulating unit 206 discriminates that the writing does not indicate updating or deleting the image file.

If the writing is updating the entry in which the image file is stored, the writing is considered to indicate updating or deleting the image file. In this case, the FD exchange emulating unit 206 checks whether or not the file name information of the image file stored in the DIR has been changed. If the file name information has been changed, the FD exchange emulating unit 206 discriminates that updating the entry indicates deleting the image file. If the file name information has not been changed, the FD exchange emulating unit 206 discriminates that updating the entry indicates updating the image file.

It may be made that when the image file is to be updated or deleted, the HD access control unit 205 and the FD exchange emulating unit 206 alert, by cooperation, indicating that the image file is to be updated or deleted. If the user provides an instruction to forcefully update or delete the image file in response to the alert, the image file may be updated or deleted.

If the FD exchange emulating unit 206 discriminates that updating the entry indicates updating or deleting the image file, the FD exchange emulating unit 206 notifies the FD access controlling unit 204 that "image file has been updated" or "image file has been deleted". The FD access controlling unit 204 notified of this information executes the following processings in the respective cases.

(1) Image File Has Been Updated

When the access to the floppy disk(R) is requested by the operating system 100, the FD access controlling unit 204 instructs the LBA correspondence table creating unit 203 to re-create the LBA correspondence table 207. When the LBA correspondence table 207 is re-created, the FD access controlling unit 204 executes the access to the SD memory card (R) 27. In other words, the writing of the image file can be emulated as the exchange of the floppy disk(R). The writing of the image file is executed by the FD image creation utility program 102 and can also be executed with, for example, a command or the like prepared by the operating system 100.

(2) Image File Has Been Deleted

When the access to the floppy disk(R) is requested by the operating system 100, the FD access controlling unit 204 urges the FD image existence checking unit 202 to check whether or not a new image file exists. If a new image file is not detected, the FD image existence checking unit 202 sends an error indicating that no floppy disk(R) is loaded, to the FD access controlling unit 204. In other words, deletion of the image file can be emulated as unloading of the floppy disk(R). If a new image file is detected, the FD access controlling unit 204 instructs the LBA correspondence table creating unit 203 to re-create the LBA correspondence table 207 and executes the access to the SD memory card(R) 27 with the new LBA correspondence table 207. In other words, the writing of the image file can be emulated as the loading of the floppy disk (R).

Incidentally, a method of checking whether or not the request for writing is directed to the LBA of the DIR in which the name of the image file is stored and, if the request for writing is directed to the LBA, discriminating that the image file is deleted, can also be adopted. In this case, if an access to a next floppy disk(R) is requested, the image file is retrieved. The deletion of the image file may be handled as exchange of the disk if the image file (or the original image file) is detected, or handled as unloading of the disk if it is not detected.

Next, operation steps concerning the emulation control of the electronic apparatus will be explained with reference to FIGS. 5 to 7.

Figure 5:
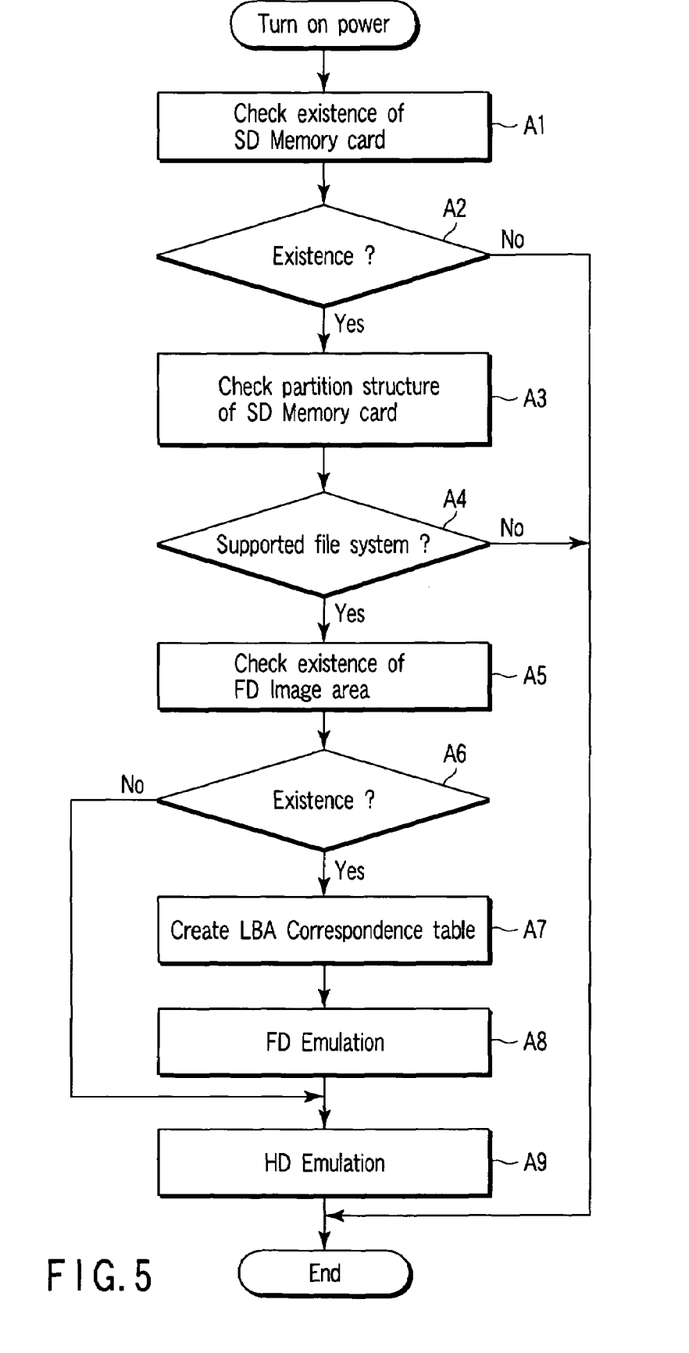

FIG. 5 is a flowchart showing operation steps concerning the emulation control when the power of the electronic apparatus is turned on.

If the power of the electronic apparatus is turned on, the media existence checking unit 201 checks whether or not the SD memory card(R) 27 is loaded in the SD card slot 22 (Step A1). If the SD memory card(R) 27 is loaded (YES of Step A2), the media existence checking unit 201 subsequently analyzes the partition structure and checks whether or not the file system of the memory card is formally supported (Step A3).

If the file system is formally supported (YES of Step A4), the FD image existence checking unit 202 checks existence of the FD image area 27b (Step A5). If the FD image area 27b exists (YES of Step A6), the LBA correspondence table creating unit 203 executes creation of the LBA correspondence table 207 (Step A7). At this time, the FD image existence checking unit 202 transfers the contents of the file system of the floppy disk(R) stored in the FD image area 27b to the operating system 100 as that of the floppy disk(R) (Step A8). The media existence checking unit 201 transfers the contents of the file system of SD memory card(R) 27 to the operating system 100 as that of the magnetic disk, irrespective of existence or absence of the FD image area 27b (Step A9).

Figure 6:
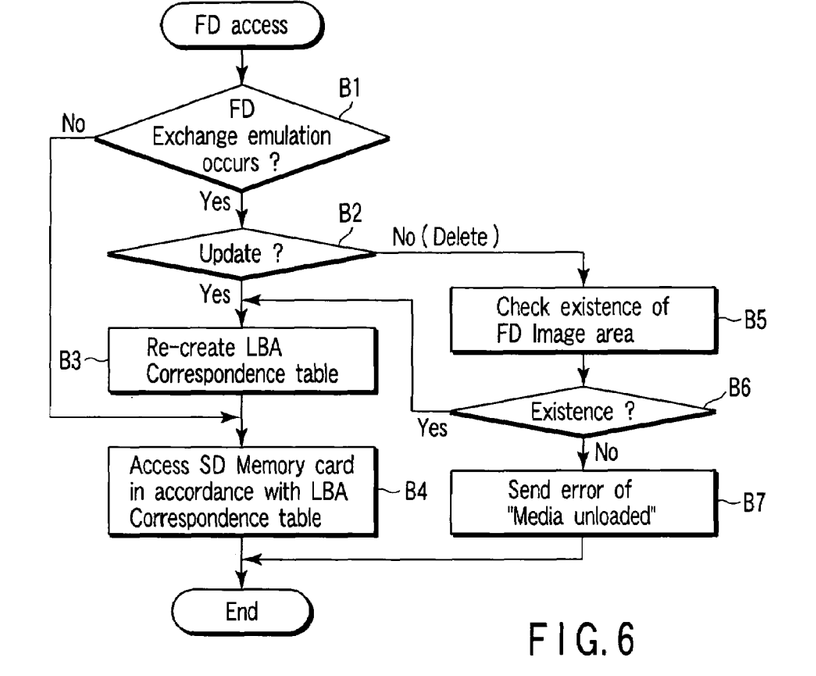
FIG. 6 is a flowchart showing operation steps concerning the emulation control in the electronic apparatus of the embodiment when an access of an operating system to a floppy disk(R) is requested.

FIG. 6 is a flowchart showing the operation steps concerning the emulation control when the operating system 100 requests an access to the floppy disk(R).

If an access to the floppy disk(R) is requested, the FD access controlling unit 204 checks whether or not the exchange emulation of the floppy disk(R) is notified by the FD exchange emulating unit 206 (Step B1). If the exchange emulation is notified (YES of Step B1), the FD access controlling unit 204 checks whether the notification indicates updating or deletion (Step B2). If the notification indicates updating (YES of Step B2), the FD access controlling unit 204 instructs the LBA correspondence table creating unit 203 to re-create the LBA correspondence table 207 at this timing (Step B3). On the basis of the LBA correspondence table 207, the FD access controlling unit 204 executes the access to the SD memory card(R) 27 (Step B4). On the other hand, if the notification indicates deletion (NO of Step B2), the FD access controlling unit 204 instructs the FD image existence checking unit 202 to check the existence of the FD image area 27b (Step B5). If the FD image area 27b exists (YES of Step B6), the FD access controlling unit 204 instructs the LBA correspondence table creating unit 203 to create the LBA correspondence table 207 (Step B3). On the basis of the LBA correspondence table 207, the FD access controlling unit 204 executes the access to the SD memory card(R) 27 (Step B4).

If the FD image area 27b does not exist (NO of Step B6), the FD access controlling unit 204 sends an error indicating that the floppy disk(R) is not loaded to the operating system 100 (Step B7).

Figure 7:
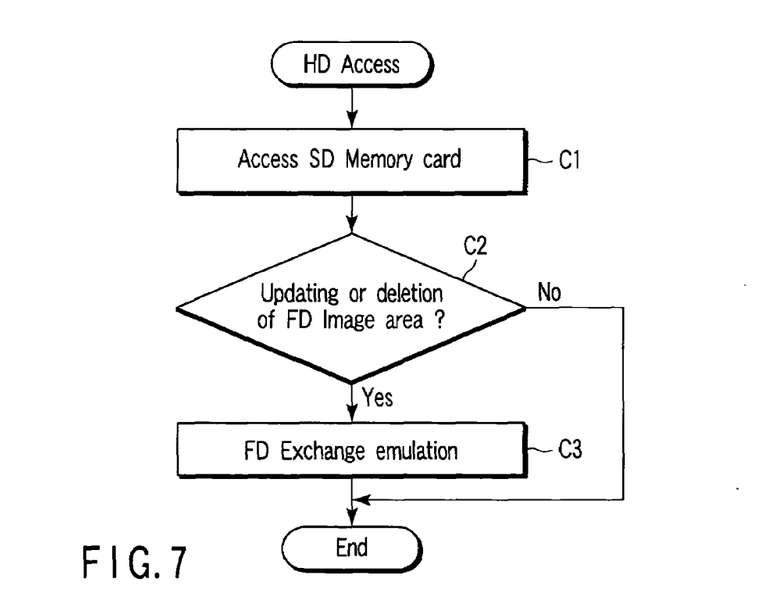
FIG. 7 is a flowchart showing operation steps concerning the emulation control in the electronic apparatus of the embodiment when an access of the operating system to a magnetic disk is requested.

FIG. 7 is a flowchart showing the operation steps concerning the emulation control when the operating system 100 requests an access to the magnetic disk.

If an access to the magnetic disk is requested, the HD access control unit 205 executes the requested access to the SD memory card(R) (Step C1). Simultaneously, the FD exchange emulating unit 206 monitors whether or not the image file is updated or deleted (Step C2). If the FD exchange emulating unit 206 detects updating or deletion of the image file (YES of Step C2), the FD exchange emulating unit 206 notifies the FD access controlling unit 204 of the exchange emulation of the floppy disk(R) (Step C3).

Thus, according to the emulation control of the electronic apparatus, the FD image area 27b stored in the HD emulation area 27a of the SD memory card(R) 27 as a file storage area can be handled as if it was the floppy disk (R). Therefore, the floppy disk (R) can be easily exchanged without an especial file system or the like. By requiring no especial file system, i.e. executing the processing on the basis of the existing file system, no problems occur in using the SD memory card(R) 27 having the FD image area 27b for a digital camera, a mobile telephone and the like in a general manner.

In the emulation of the above-described embodiment, the SD memory card(R) 27 can be handled as if it was the magnetic disk. However, the SD memory card(R) 27 can also be emulated as various storage mediums. The SD memory card (R) 27 can be emulated as the storage medium adopting the file system having the MBR as shown in FIG. 3, in the same manner as the magnetic disk. A storage medium adopting the file system having no MBR, for example, an MO (Magneto Optical Disk) formatted in the Supper Floppy type includes the DBR in its leading sector (where LBA is zero). The logic structure is the same as that in each of partitions shown in FIG. 3. Thus, the operation steps following obtaining the LBA of the DBR from the partition table in the case of emulating the magnetic disk may be executed to emulate the MO. Needless to say, the SD memory card(R) can be replaced with the other semiconductor memory or the like.

Figure 8:
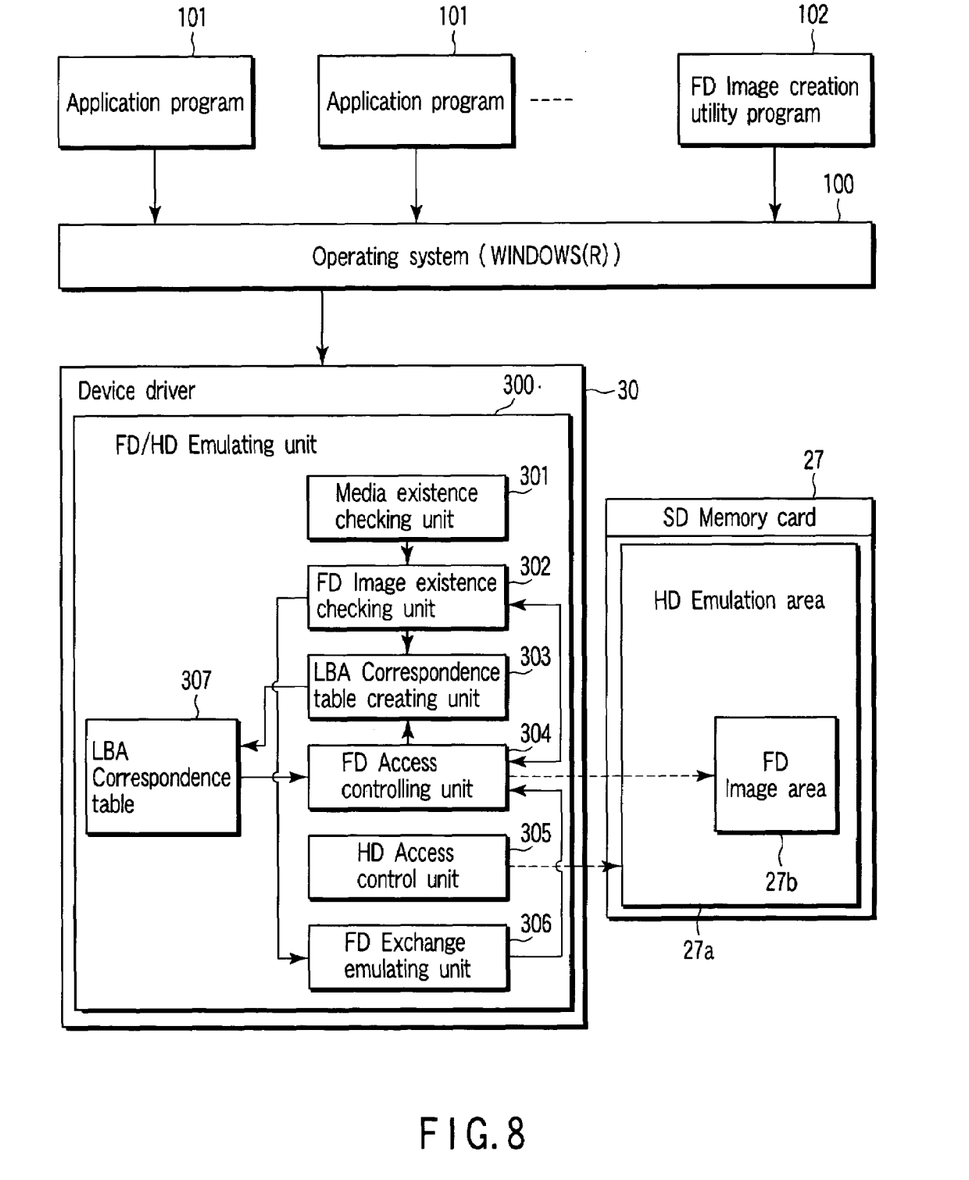
FIG. 8 is an illustration showing function blocks in a case where the emulation control in the electronic apparatus of the embodiment is executed by a device driver.

In addition, the emulation control is executed by BIOS 16 in the above-described embodiment. For example, however, if the operation system 100 is WINDOWS(R) of Microsoft Corporation, the emulation control may be executed by an exclusive device driver 30 as shown in FIG. 8. In this case, the SD memory card(R) 27 can be handled as if it was a removable magnetic disk, and should preferably be emulated as a removable magnetic disk. If the operation system 100 is capable of handling the SD memory card(R) 27, it is unnecessary to emulate the entire body of the SD memory card(R) 27 as if it was the other storage medium, but access to the FD image area 27b, which accompanies updating or deletion of the image file, to emulate the exchange of the floppy disk(R), need only to be monitored.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An emulation system of an electronic apparatus including a slot in which a first storage medium is loaded and which executes file management by an operating system, the emulation system comprising:

a discrimination unit configured to analyze a file system of the first storage medium loaded in the slot, and to discriminate whether or not an image file containing duplicate contents of a second storage medium different in kind from the first storage medium is stored in the first storage medium, the image file being named based on a predetermined naming rule;

a correspondence table creation unit configured to create an address correspondence table to associate, based on an output of the discrimination unit, first address information indicating a location on the first storage medium with second address information indicating a corresponding location on the image file, if the image file is stored in the first storage medium;

an first emulation unit configured to convert the address information on the second storage medium received from the operating system into the address information on the first storage medium in accordance with the address correspondence table, and to execute an access to the second storage medium with an access to the image file; and a second emulation unit configured to allow the operating system to recognize the first storage medium loaded in the slot as a third storage medium different in kind from the first storage medium and the second storage medium by transferring the contents of the filing system of the first storage medium to the operating system as those of the third storage medium, the first storage medium being incapable of being handled by the operating system and the third storage medium being capable of being handled by the operating system.

2. The emulation system according to claim 1, wherein the first storage medium is detachable from the electronic apparatus and the third storage medium is not detachable from the electronic apparatus.

3. The emulation system according to claim 1, wherein the correspondence table creation unit creates the address correspondence table to associate the address information of the second storage medium in which CHS (Cylinder, Head, Sector) type is converted into LBA (Logical Block Address) type with the address information of the first storage medium in the LBA type.

4. The emulation system according to claim 1, further comprising a media exchange emulation unit configured to create a condition that the second storage medium is exchanged by allowing the correspondence table creation unit to re-create the address correspondence table, if the image file is rewritten by an access to the first storage medium.

5. The emulation system according to claim 4, wherein the media exchange emulation unit creates a condition that the second storage medium is detached by allowing the emulation means to send back a media unloading error about an access to the second storage medium after the deletion, if the image file is deleted by the access to the first storage medium.

6. The emulation system according to claim 4, wherein the media exchange emulation unit creates a condition the second storage medium is newly loaded by allowing the correspondence table creation unit to re-create the address correspondence table, if the image file is newly written by the access to the first storage medium after creating the condition that the second storage medium is detached in accordance with the deletion of the image file.

* * * * *